US011095247B2

(12) United States Patent
Toko et al.

(10) Patent No.: US 11,095,247 B2
(45) Date of Patent: Aug. 17, 2021

(54) CONTROLLER FOR MOTOR

(71) Applicants: JTEKT CORPORATION, Osaka (JP); DENSO CORPORATION, Kariya (JP)

(72) Inventors: Takahiro Toko, Takahama (JP); Atsuo Sakai, Okazaki (JP); Ryo Irie, Okazaki (JP); Yoshihide Kuroda, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/801,802

(22) Filed: Feb. 26, 2020

(65) Prior Publication Data

US 2020/0295698 A1 Sep. 17, 2020

(30) Foreign Application Priority Data

Mar. 11, 2019 (JP) .............................. JP2019-043676

(51) Int. Cl.
| | |
|---|---|
| *H02P 29/028* | (2016.01) |
| *B62D 5/00* | (2006.01) |
| *B62D 5/04* | (2006.01) |
| *B62D 15/02* | (2006.01) |
| *H02P 27/06* | (2006.01) |

(52) U.S. Cl.
CPC ............ *H02P 29/028* (2013.01); *B62D 5/046* (2013.01); *B62D 15/021* (2013.01); *H02P 27/06* (2013.01)

(58) Field of Classification Search
USPC ........................................................ 318/560
See application file for complete search history.

(56) References Cited

U.S. PATENT DOCUMENTS

| | | | |
|---|---|---|---|
| 8,791,644 B2 * | 7/2014 | Vitunic | .............. H05B 45/3725 |
| | | | 315/291 |
| 2006/0279146 A1 * | 12/2006 | Ishigami | .............. H02K 15/095 |
| | | | 310/71 |

(Continued)

FOREIGN PATENT DOCUMENTS

| | | |
|---|---|---|
| EP | 3196711 A1 | 7/2017 |
| JP | 2018-024335 A | 2/2018 |

OTHER PUBLICATIONS

Jul. 31, 2020 Extended Search Report issued in European Patent Application 20159826.5.

(Continued)

*Primary Examiner* — Bentsu Ro
(74) *Attorney, Agent, or Firm* — Oliff PLC

(57) ABSTRACT

A controller for a motor includes a first processing circuit and a second processing circuit. The first processing circuit is configured to execute a first operation amount calculation process, an operation process, and an output process. The first operation amount calculation process is a process of calculating a first operation amount. The operation process is a process of operating a first drive circuit. The second processing circuit is configured to execute a second operation amount calculation process, a first use operation process, a second use operation process, and an initial value setting process. The second operation amount calculation process is a process of calculating a second operation amount. The initial value setting process is a process of setting an initial value of an integral element depending on a value of an integral element of the first operation amount calculation process.

6 Claims, 3 Drawing Sheets

(56) References Cited

U.S. PATENT DOCUMENTS

| | | | |
|---|---|---|---|
| 2008/0191577 A1* | 8/2008 | Cope | H02K 41/03 |
| | | | 310/216.004 |
| 2011/0248658 A1* | 10/2011 | O'Gorman | H02P 6/18 |
| | | | 318/400.32 |
| 2017/0361869 A1 | 12/2017 | Hales | |
| 2018/0043928 A1 | 2/2018 | Fujita et al. | |
| 2021/0070361 A1* | 3/2021 | Erickson | B62D 15/0235 |

OTHER PUBLICATIONS

Bennett, John, "Fault Tolerant Electromechanical Actuators for Aircraft", New Castle University School of Electrical, Electronic and Computer Engineering, pp. 1-236.

* cited by examiner

CONTROLLER FOR MOTOR

CROSS-REFERENCE TO RELATED APPLICATION

This application claims priority to Japanese Patent Application No. 2019-043676 filed on Mar. 11, 2019, incorporated herein by reference in its entirety.

BACKGROUND

1. Technical Field

The present disclosure relates to a controller configured to control a motor that turns steered wheels and includes a first stator coil and a second stator coil insulated from each other. The controller for the motor is configured to operate a first drive circuit connected to the first stator coil and a second drive circuit connected to the second stator coil.

2. Description of Related Art

For example, Japanese Unexamined Patent Application Publication No. 2018-24335 describes a motor that turns steered wheels and includes two stator coils independent of each other. This document describes a redundant controller including microcomputers for the respective stator coils as a controller for the motor that operates drive circuits connected to the stator coils. Each of the pair of microcomputers controls dq-axis currents of the motor by calculating the dq-axis currents based on a detection value from each rotation angle sensor. This document also describes that a current command value of the first microcomputer is used by the second microcomputer.

SUMMARY

The inventors have conducted research on the redundant controller in that the steered angle of each steered wheel is detected by the rotation angle sensors and detection values are fed back to a target value. In this case, the controllability of the steered angle may decrease due to a difference between the detection values from the rotation angle sensors.

According to the present disclosure, the decrease in the controllability of the steered angle can be suppressed even if the difference occurs between the detection values from the rotation angle sensors.

An aspect of the present disclosure relates to a controller for a motor. The motor is configured to turn a steered wheel and includes a first stator coil and a second stator coil insulated from each other. The controller is configured to operate a first drive circuit connected to the first stator coil and a second drive circuit connected to the second stator coil. The controller includes a first processing circuit and a second processing circuit configured to communicate with each other. The first processing circuit is configured to execute a first operation amount calculation process, an operation process, and an output process. The first operation amount calculation process is a process of calculating a first operation amount based on an output value of an integral element depending on a difference between a target angle and a convertible angle that is based on a detection value from a first angle sensor. The convertible angle is an angle convertible into a steered angle of the steered wheel. The operation process is a process of operating the first drive circuit based on the first operation amount. The output process is a process of outputting the first operation amount to the second processing circuit. The second processing circuit is configured to execute a second operation amount calculation process, a first use operation process, a second use operation process, and an initial value setting process. The second operation amount calculation process is a process of calculating a second operation amount based on an output value of an integral element depending on a difference between the target angle and a convertible angle that is based on a detection value from a second angle sensor. The first use operation process is a process of operating the second drive circuit based on the first operation amount. The second use operation process is a process of operating the second drive circuit based on the second operation amount. The initial value setting process is a process of setting, depending on a value of the integral element of the first operation amount calculation process, an initial value of the integral element to be used for calculating the second operation amount along with switching from the first use operation process to the second use operation process.

In the configuration described above, the second processing circuit operates the second drive circuit based on the first operation amount in the first use operation process. Therefore, both the first drive circuit and the second drive circuit are operated by the operation amount for feeding back, to the target angle, the convertible angle that is based on the detection value from the first angle sensor. Thus, a decrease in the controllability of the steered angle can be suppressed even if a difference occurs between the detection value from the first angle sensor and the detection value from the second angle sensor.

Since the first operation amount is calculated by using the integral element in the first operation amount calculation process, the first operation amount is a value for eliminating a steady-state deviation between the target angle and the convertible angle that is based on the first angle sensor. When the second operation amount is used by switching the first use operation process to the second use operation process, a torque of the motor may abruptly change depending on the output value of the integral element of the second operation amount calculation process. In the configuration described above, the initial value of the integral element to be used for calculating the second operation amount is set depending on the value of the integral element of the first operation amount calculation process. Thus, it is possible to suppress the abrupt change in the torque of the motor when the first use operation process is switched to the second use operation process.

In the controller described above, the second operation amount calculation process may include a process of calculating, when the first use operation process is performed, the second operation amount independently of the integral element to be used for calculating the second operation amount. The initial value setting process may include a process of setting the initial value depending on a difference between the first operation amount and the second operation amount along with the switching from the first use operation process to the second use operation process.

In the configuration described above, when the first use operation process is performed, the integral element is stopped in the second operation amount calculation process. When the first use operation process is switched to the second use operation process, the difference between the second operation amount and the first operation amount corresponds to the integral element of the first operation amount calculation process. In the configuration described above, the initial value is set depending on the difference between the first operation amount and the second operation amount. Thus, it is possible to suppress the abrupt change in the torque of the motor when the first use operation process is switched to the second use operation process.

In the controller described above, the second processing circuit may be configured to execute a process of switching the first use operation process to the second use operation process when an abnormality occurs such that the first processing circuit stops operating the first drive circuit. The second operation amount calculation process may include a process of calculating the second operation amount by using the integral element when the first use operation process is switched to the second use operation process based on the abnormality occurring such that the first processing circuit stops operating the first drive circuit.

If the first processing circuit stops operating the first drive circuit, the first operation amount is not reflected in the control on the motor. When the second operation amount is calculated independently of the integral element, it is difficult to reduce the steady-state deviation between the convertible angle and the target angle. In the configuration described above, if the first processing circuit stops operating the first drive circuit, the second operation amount is calculated based on the integral element. Thus, it is possible to reduce the steady-state deviation between the target angle and the convertible angle that is based on the second angle sensor.

In the controller described above, the second processing circuit may be configured to execute a process of switching the first use operation process to the second use operation process when an absolute value of a difference between the first operation amount and the second operation amount is equal to or larger than a defined value while the first use operation process is performed. The second operation amount calculation process may include a process of calculating the second operation amount independently of the integral element when the first use operation process is performed. The second operation amount calculation process may include a process of calculating the second operation amount independently of the integral element to be used for calculating the second operation amount when the first use operation process is switched to the second use operation process based on a fact that the absolute value of the difference between the first operation amount and the second operation amount is equal to or larger than the defined value.

In the configuration described above, the second operation amount is calculated even if the second drive circuit is operated based on the first operation amount. Therefore, the appropriateness of the control using the first operation amount can be evaluated based on comparison between the first operation amount and the second operation amount. In the configuration described above, when determination is made that the appropriateness is low, the second drive circuit is operated based on the second operation amount. In this case, the second operation amount is calculated independently of the integral element. Thus, even if a difference occurs between the detection value from the first angle sensor and the detection value from the second angle sensor, it is possible to avoid interference between the control for reducing, by using the integral element, the steady-state deviation between the target angle and the convertible angle that is based on the detection value from the first angle sensor and the control for reducing, by using the integral element, the steady-state deviation between the target angle and the convertible angle that is based on the detection value from the second angle sensor.

In the controller described above, the second processing circuit may be configured to execute a process of switching the first use operation process to the second use operation process when an abnormality occurs in communication between the first processing circuit and the second processing circuit. The second operation amount calculation process may include a process of calculating the second operation amount independently of the integral element to be used for calculating the second operation amount when the first use operation process is switched to the second use operation process based on the abnormality occurring in the communication.

In the configuration described above, if the first operation amount cannot be acquired due to an abnormality in the communication, the second processing circuit operates the second drive circuit based on the second operation amount. Thus, the second drive circuit can be operated even if the first operation amount cannot be acquired. Moreover, the second operation amount is calculated independently of the integral element. Thus, even if a difference occurs between the detection value from the first angle sensor and the detection value from the second angle sensor, it is possible to avoid interference between the control for reducing, by using the integral element, the steady-state deviation between the target angle and the convertible angle that is based on the detection value from the first angle sensor and the control for reducing, by using the integral element, the steady-state deviation between the target angle and the convertible angle that is based on the detection value from the second angle sensor.

In the controller described above, the second operation amount calculation process may be a process of calculating the second operation amount based on an operation amount for feed forward controlling the convertible angle to the target angle in addition to an operation amount for feedback controlling the convertible angle to the target angle.

In the configuration described above, the second operation amount is calculated based on the operation amount for feedforward control. Therefore, the output of the integral element compensates a deviation in the control using the feedforward operation amount. Thus, the deviation between the convertible angle and the target angle can be reduced even if the second operation amount is calculated independently of the integral element as compared to a case where the feedforward operation amount is not used.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
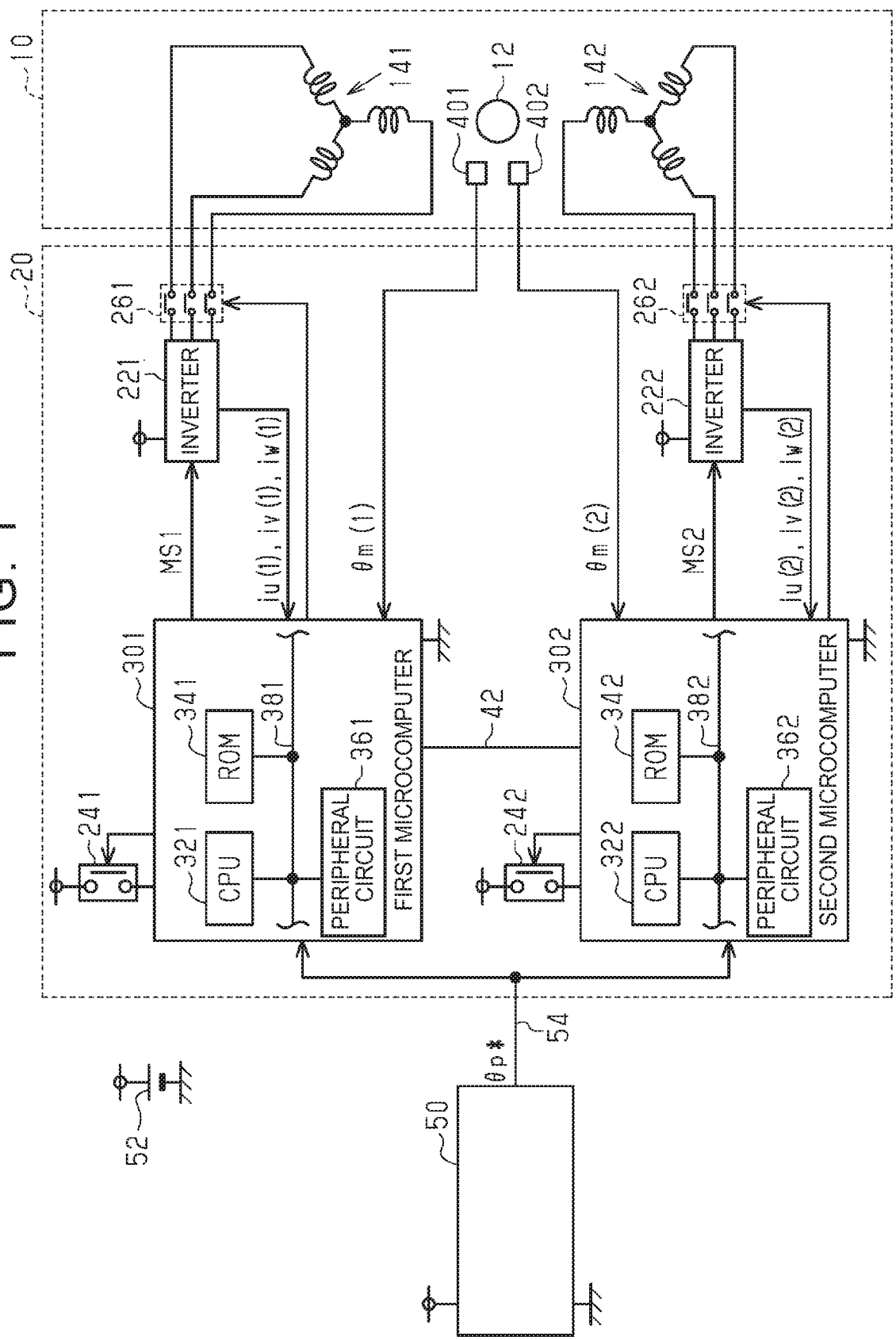
FIG. 1 is a diagram illustrating a controller and a motor according to one embodiment.

A controller for a motor according to one embodiment is described below with reference to the drawings. A motor 10 illustrated in FIG. 1 is a power source for a steering operation actuator configured to turn steered wheels. In this embodiment, a surface permanent magnet synchronous motor (SPMSM) is exemplified as the motor 10. The motor 10 includes one rotor 12 and a first stator coil 141 and a second stator coil 142 that are a pair of stator coils. A controller 20 controls the motor 10, and controls a torque that is a control amount of the motor 10. The controller 20 includes a first-system circuit and a second-system circuit that are different circuits corresponding to the first stator coil 141 and the second stator coil 142.

Specifically, the controller 20 includes the following components as the first-system circuit. That is, the controller 20 includes a first inverter 221 and a first microcomputer 301. The first inverter 221 is connected to the first stator coil 141. The first microcomputer 301 controls a current flowing through the first stator coil 141 by outputting an operation signal MS1 to the first inverter 221. The controller 20 includes the following components as the second-system circuit. That is, the controller 20 includes a second inverter 222 and a second microcomputer 302. The second inverter 222 is connected to the second stator coil 142. The second microcomputer 302 controls a current flowing through the second stator coil 142 by outputting an operation signal MS2 to the second inverter 222. The first microcomputer 301 and the second microcomputer 302 are communicable via a communication line 42.

When the first system and the second system are described collectively, a letter "k" that may take a value "1" or "2" is used hereinafter to describe, for example, that "a k-th inverter 22$k$ is connected to a k-th stator coil 14$k$".

A k-th microcomputer 30$k$ acquires a rotation angle θm(k) of the rotor 12 that is detected by a k-th angle sensor 40$k$, and three-phase currents iu(k), iv(k), and iw(k) flowing through the k-th stator coil 14$k$. For example, the currents iu(k), iv(k), and iw(k) may be detected as voltage drops of shunt resistors connected to legs of the k-th inverter 22$k$.

The k-th microcomputer 30$k$ includes a central processing unit (CPU) 32$k$, a read-only memory (ROM) 34$k$, and a peripheral circuit 36$k$, which are communicable via a local network 38$k$. The peripheral circuit 36$k$ includes a power supply circuit, a reset circuit, and a circuit configured to generate a clock signal for defining internal operations based on an external clock signal.

The controller 20 is communicable with an external higher-level electronic control unit (ECU) 50 via a communication line 54. A target angle θp* output from the higher-level ECU 50 is input to the first microcomputer 301 and the second microcomputer 302. The target angle θp* is a target value of a convertible angle, which is convertible into a steered angle of each steered wheel (tire turning angle). In this embodiment, the target angle θp* is a target value of a rotation angle of a steering shaft. A terminal voltage of a battery 52 is applied to each of the higher-level ECU 50, the k-th microcomputer 30$k$, and the k-th inverter 22$k$. Specifically, the voltage of the battery 52 is applied to the k-th microcomputer 30$k$ via a relay 24$k$. A relay 26$k$ is provided between the k-th inverter 22$k$ and the k-th stator coil 14$k$.

Figure 2:
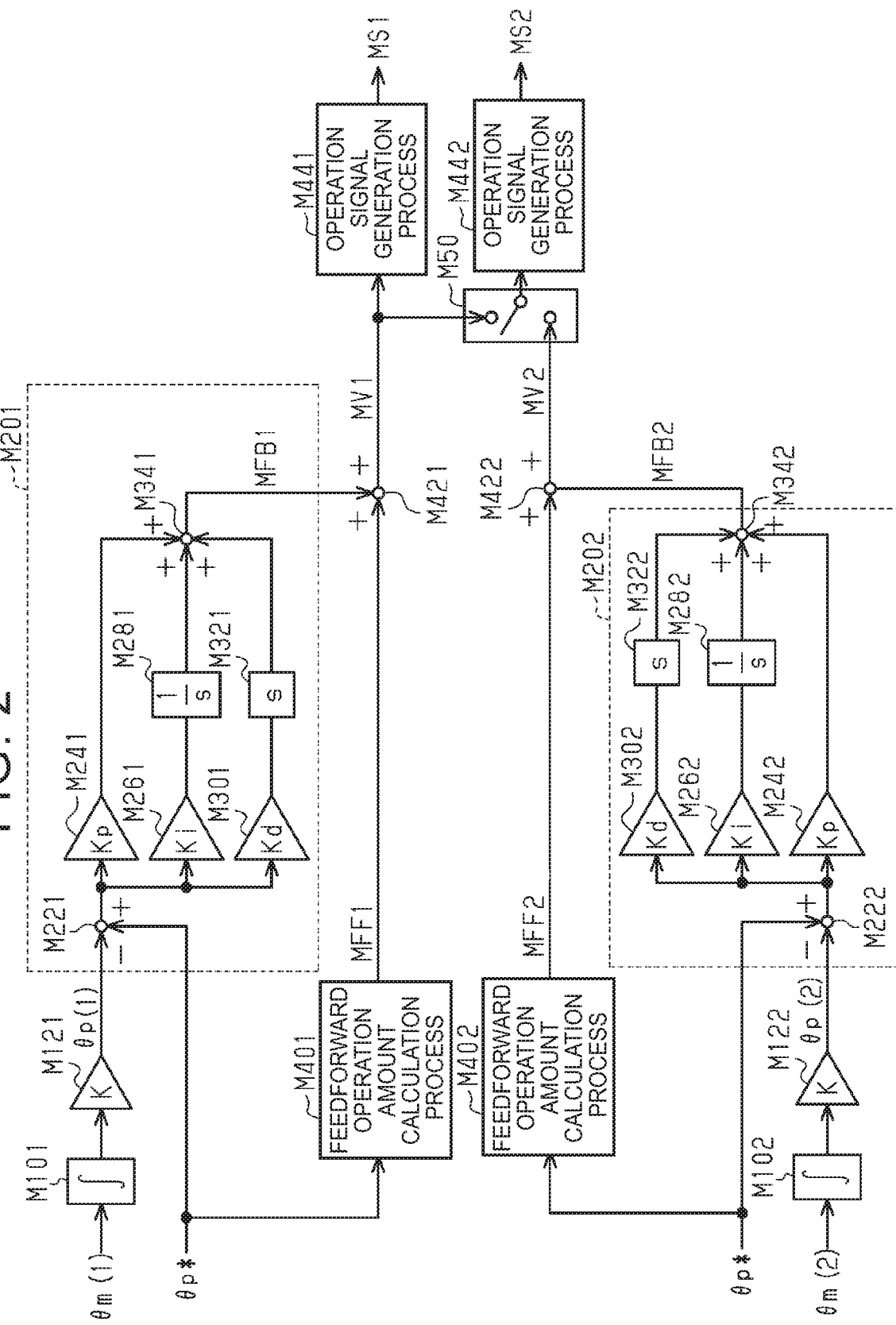
FIG. 2 is a diagram illustrating a part of a process to be executed by the controller according to the embodiment.

FIG. 2 illustrates processes to be executed by the first microcomputer 301 and the second microcomputer 302. Each process illustrated in FIG. 2 is implemented such that a program stored in the ROM 34$k$ is executed by the CPU 32$k$. When the processes to be executed by the first microcomputer 301 and the second microcomputer 302 are described collectively, a letter "k" is used.

An integration process M10$k$ is a process of integrating the rotation angle θm(k). A conversion process M12$k$ is a process of multiplying an output of the integration process M10$k$ by a predetermined coefficient K to convert the output into a rotation angle θp(k) of the steering shaft. The rotation angle θp(k) is "0" at a neutral position, and its sign varies depending on whether the turn is a right turn or a left turn.

A feedback operation amount calculation process M20$k$ is a process of calculating a feedback operation amount MFBk for feeding back the rotation angle θp(k) to the target angle θp*. In this embodiment, the feedback operation amount MFBk is basically the sum of an output value of a proportional element, an output value of an integral element, and an output value of a derivative element. Specifically, a deviation calculation process M22$k$ is a process of calculating a difference between the rotation angle θp(k) and the target angle θp*. A proportional element M24$k$ is a process of multiplying the difference by a proportional coefficient Kp. An integral gain multiplication process M26$k$ is a process of multiplying the difference by an integral gain Ki. An integral process M28$k$ is a process of updating and outputting an integrated value of outputs of the integral gain multiplication process M26$k$. The integral gain multiplication process M26$k$ and the integral process M28$k$ constitute the integral element. A derivative gain multiplication process M30$k$ is a process of multiplying the difference by a derivative gain Kd. A derivative process M32$k$ is a process of calculating a derivative of an output of the derivative gain multiplication process M30$k$. The derivative gain multiplication process M30$k$ and the derivative process M32$k$ constitute the derivative element. An addition process M34$k$ is a process of computing the sum of the output values of the proportional element M24$k$, the integral process M28$k$, and the derivative process M32$k$ and outputting the sum as the feedback operation amount MFBk.

A feedforward operation amount calculation process M40$k$ is a process of calculating a feedforward operation amount MFFk for control to achieve the target angle θp*. Specifically, the feedforward operation amount calculation process M40$k$ is a process of increasing the absolute value of the feedforward operation amount MFFk in a case where the absolute value of the target angle θp* is large than that in a case where the absolute value of the target angle θp* is small. For example, this process can be implemented such that the CPU 32$k$ map-computes the feedforward operation amount MFFk in a state in which the ROM 34$k$ prestores map data having the target angle θp* as an input variable and the feedforward operation amount MFFk as an output variable. The map data is data showing combinations of discrete values of the input variable and values of the output variable corresponding to the values of the input variable. For example, the map computing may be such a process that, when the value of the input variable matches any value of the input variable in the map data, the computing result is a corresponding value of the output variable in the map data and, when there is no match, the computing result is a value obtained by interpolating a plurality of values of the output variable included in the map data.

An addition process M42$k$ is a process of calculating a k-th operation amount MVk by adding the feedback operation amount MFBk and the feedforward operation amount MFFk. The k-th operation amount MVk is a q-axis current command value.

A first operation signal generation process M441 is a process of calculating and outputting the operation signal MS1 of the first inverter 221 so that a q-axis current flowing through the first stator coil 141 is "½" of a first operation amount MV1.

A selection process M50 is a process of selectively outputting one of the two operation amounts that are the first operation amount MV1 and a second operation amount MV2 to a second operation signal generation process M442.

The second operation signal generation process M442 is a process of calculating and outputting the operation signal MS2 of the second inverter 222 so that a q-axis current flowing through the second stator coil 142 is "½" of the output of the selection process M50 in principle.

Figure 3:
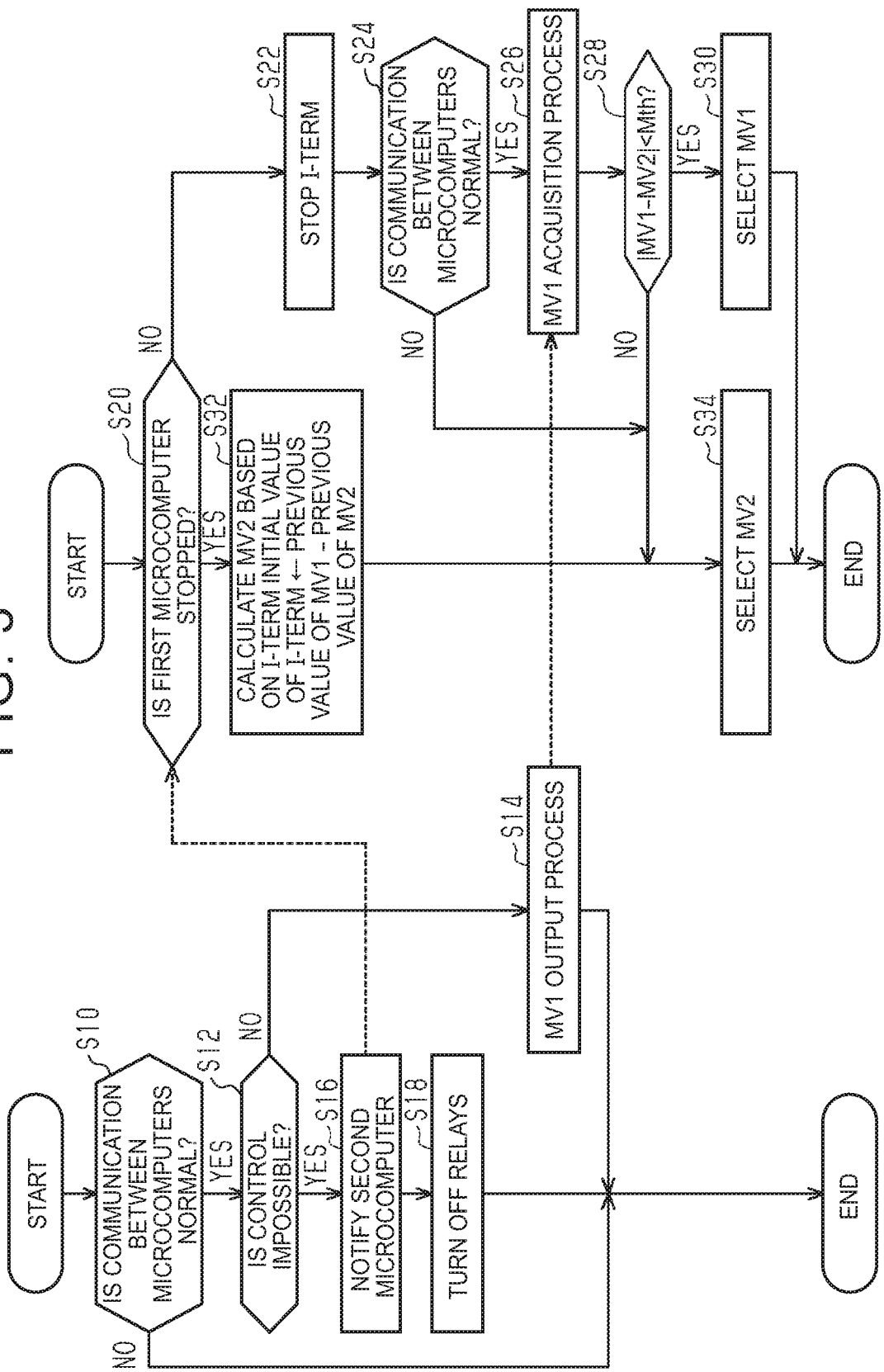
FIG. 3 is a flowchart illustrating a procedure of the process to be executed by the controller.

In this embodiment, the processes of FIG. 2 are basic processes, but are changed as appropriate by executing processes illustrated in FIG. 3. A left part of FIG. 3 illustrates processes to be implemented such that a program stored in a ROM 341 is repeatedly executed by a CPU 321 in, for example, a predetermined period. A right part of FIG. 3 illustrates processes to be implemented such that a program stored in a ROM 342 is repeatedly executed by a CPU 322 in, for example, a predetermined period. The processes of FIG. 3 are described below assuming several situations.

In the series of processes illustrated in the left part of FIG. 3, the CPU 321 first determines whether communication between the first microcomputer 301 and the second microcomputer 302 is normal (S10). For example, predetermined data may periodically be exchanged between the first microcomputer 301 and the second microcomputer 302 via the communication line 42, and determination may be made that an abnormality occurs when the data cannot be exchanged.

When the CPU 321 determines that the communication is normal (S10: YES), the CPU 321 determines whether the first microcomputer 301 cannot control the current flowing through the first stator coil 141 by operating the first inverter 221 (S12). For example, the CPU 321 determines that the control is impossible when an abnormality occurs in a first angle sensor 401 or when the temperature of the first stator coil 141 or the first inverter 221 is equal to or higher than a predefined temperature. For example, determination may be made that an abnormality occurs in the first angle sensor 401 when an output signal from the first angle sensor 401 is fixed to a ground potential or a terminal potential of the battery 52. For example, whether the temperature of the first stator coil 141 or the first inverter 221 is equal to or higher than the predefined temperature may be determined based on histories of currents iu(1), iv(1), and iw(1).

When the CPU 321 determines that the current flowing through the first stator coil 141 can be controlled (S12: NO), the CPU 321 outputs the first operation amount MV1 to the second microcomputer 302 via the communication line 42 (S14). When the CPU 321 completes the process of S14, the CPU 321 temporarily terminates the series of processes illustrated in the left part of FIG. 3.

As illustrated in the right part of FIG. 3, the CPU 322 determines whether the first microcomputer 301 stops controlling the current flowing through the first stator coil 141 (S20). When the first microcomputer 301 is operating (S20: NO), the CPU 322 stops an integral process M282 (S22). Specifically, a value held in the integral process M282 is fixed to an initial value "0". Thus, a feedback operation amount MFB2 is the sum of an output value of a proportional element M242 and an output value of a derivative process M322, and the second operation amount MV2 is the sum of the feedback operation amount MFB2 and a feedforward operation amount MFF2.

The CPU 322 determines whether the communication between the first microcomputer 301 and the second microcomputer 302 is normal (S24). When the CPU 322 determines that the communication is normal (S24: YES), the CPU 322 acquires the first operation amount MV1 output through the process of S14 in the left part of FIG. 3 (S26). The CPU 322 determines whether the absolute value of a difference between the first operation amount MV1 and the second operation amount MV2 is smaller than a defined value Mth (S28). This process is a process of determining whether the control on the rotation angle θp(k) toward the target angle θp* is performed properly. That is, the difference between the first operation amount MV1 and the second operation amount MV2 is expected to be a difference between feedback operation amounts MFB1 and MFB2, and this difference may be infinitesimal.

That is, the first reason why the difference occurs between the feedback operation amounts MFB1 and MFB2 is that the output value of the integral process M282 is "0". An output value of an integral process M281 compensates a deviation in the control using the feedforward operation amount MFF1, and therefore the absolute value is not extremely large. The second reason why the difference occurs between the feedback operation amounts MFB1 and MFB2 is a difference between proportional elements M241 and M242 and a difference between derivative processes M321 and M322 due to a difference between a rotation angle θm(1) detected by the first angle sensor 401 and a rotation angle θm(2) detected by a second angle sensor 402. Since the absolute value of the difference between the rotation angles θm(1) and θm(2) is infinitesimal, the absolute value of the difference between the proportional elements M241 and M242 and the absolute value of the difference between the derivative processes M321 and M322 are also small.

When the CPU 322 determines that the absolute value is smaller than the defined value Mth (S28: YES), the control may be performed properly. Therefore, the first operation amount MV1 is selected in the selection process M50 (S30). Thus, the operation signal MS2 for operating the second inverter 222 is generated and output so that the q-axis current flowing through the second stator coil 142 is "½" of the first operation amount MV1 through the second operation signal generation process M442. When the CPU 322 completes the process of S30, the CPU 322 temporarily terminates the series of processes illustrated in the right part of FIG. 3.

When the CPU 321 determines that the result of the process of S12 is "YES" as illustrated in the left part of FIG. 3, the CPU 321 notifies the second microcomputer 302 via the communication line 42 that the first microcomputer 301 cannot perform the control (S16). The CPU 321 switches relays 241 and 261 to open states through the peripheral circuit 361 or the like (S18). When the CPU 321 completes the process of S18, the CPU 321 temporarily terminates the series of processes illustrated in the left part of FIG. 3.

In this case, as illustrated in the right part of FIG. 3, the CPU 322 determines that the first microcomputer 301 stops controlling the current flowing through the first stator coil 141 (S20: YES), and executes the process of calculating the second operation amount MV2 based on an integral element (I-term) by operating the integral process M282 (S32). Specifically, the CPU 322 sets an initial value of the integral process M282 to a value obtained by subtracting a previous value of the second operation amount MV2 from a previous value of the first operation amount MV1. The initial value is set as a previous value, and a value obtained by adding, to the previous value, a value obtained by multiplying together the integral gain Ki and a value obtained by subtracting a current value of a rotation angle θp(2) from a current value of the target angle θp* is used for calculating an initial second operation amount MV2 to be used for operating the second inverter 222.

The CPU 322 selects the second operation amount MV2 in the selection process M50 (S34). In this case, the operation signal MS2 for operating the second inverter 222 is generated and output so that the q-axis current flowing through the second stator coil 142 is the second operation amount MV2 through the second operation signal generation process M442. Since the first stator coil 141 is not energized, it is necessary that the q-axis current flowing through the second stator coil 142 be set to the second operation amount MV2 to control the rotation angle θp(2) toward the target angle θp*. When the CPU 322 completes the process of S34, the CPU 322 temporarily terminates the series of processes illustrated in the right part of FIG. 3.

In this case, it is assumed that the process of S14 in the left part of FIG. 3 is performed. In this case, the CPU 322 determines that the result is "NO" in the process of S28 illustrated in the right part of FIG. 3, and proceeds to the process of S34. Thus, the operation signal MS2 for operating the second inverter 222 is generated and output so that the q-axis current flowing through the second stator coil 142 is "½" of the second operation amount MV2 through the second operation signal generation process M442.

When the CPU 321 determines that an abnormality occurs in the communication between the microcomputers as illustrated in the left part of FIG. 3 (S10: NO), the CPU 321 temporarily terminates the series of processes illustrated in the left part of FIG. 3.

In this case, the CPU 322 determines that the result is "NO" in the process of S24 illustrated in the right part of FIG. 3, and proceeds to the process of S34. Thus, the operation signal MS2 for operating the second inverter 222 is generated and output so that the q-axis current flowing through the second stator coil 142 is "½" of the second operation amount MV2 through the second operation signal generation process M442.

Actions and effects of this embodiment are described. The CPU 321 calculates the first operation amount MV1 for controlling the rotation angle θp(1) toward the target angle θp*, and operates the first inverter 221 so that the q-axis current flowing through the first stator coil 141 is "½" of the first operation amount MV1. The CPU 322 operates the second inverter 222 so that the q-axis current flowing through the second stator coil 142 is "½" of the first operation amount MV1. Therefore, interference with the control on the steered angle of each steered wheel can be suppressed as compared to a case where the q-axis current flowing through the second stator coil 142 is the second operation amount MV2 when the integral process M282 is operated. A difference may occur between the rotation angle θm(1) detected by the first angle sensor 401 and the rotation angle θm(2) detected by the second angle sensor 402. If the difference occurs, the output value of the integral process M281 performed by the CPU 321 is a value for eliminating a steady-state deviation between the rotation angle θp(1) and the target angle θp*, and the output value of the integral process M282 performed by the CPU 322 is a value for eliminating a steady-state deviation between the rotation angle θp(2) and the target angle θp*. Therefore, interference may occur in the control.

If the first microcomputer 301 cannot control the q-axis current in the first stator coil 141, the first microcomputer 301 stops controlling the current flowing through the first stator coil 141. In this case, the CPU 322 performs control so that the q-axis current flowing through the second stator coil 142 is the second operation amount MV2. The integral process M282 is stopped before the control using the first operation amount MV1 is switched to the control using the second operation amount MV2. Before the switching, the output value of the integral process M281 may be a value for eliminating the steady-state deviation between the rotation angle θp(1) and the target angle θp*. When the second operation amount MV2 is used while starting the operation of the integral process M282, a difference corresponding to the output value of the integral process M281 occurs between the second operation amount MV2 at the time of switching and the first operation amount MV1 immediately before the switching. In this embodiment, the initial value of the integral process M282 is set to the difference between the first operation amount MV1 and the second operation amount MV2 along with the switching. The difference between the first operation amount MV1 and the second operation amount MV2 may be a value corresponding to the output value of the integral process M281. Therefore, the initial value of the integral process M282 can be set to the value corresponding to the output value of the integral process M281 immediately before the switching. Thus, it is possible to suppress an abrupt change in the torque of the motor 10 along with the switching.

If an abnormality occurs in the control but the first microcomputer 301 cannot identify the cause of the abnormality, the CPU 322 detects the abnormality based on the fact that the absolute value of the difference between the first operation amount MV1 and the second operation amount MV2 is equal to or larger than the defined value Mth. In this case, the CPU 322 uses the second operation amount MV2 for operating the second inverter 222. Thus, contribution of the first operation amount MV1 to the control toward the target angle θp* can be reduced as compared to a case where the first operation amount MV1 is used for operating the second inverter 222 even though the abnormality occurs in the first operation amount MV1. In this case, the CPU 322 calculates the second operation amount MV2 while stopping the integral process M282. Thus, it is possible to avoid the interference with the control due to the case where the output values of the integral processes M281 and M282 are values for eliminating different steady-state deviations.

If an abnormality occurs in the communication between the first microcomputer 301 and the second microcomputer 302, the CPU 322 uses the second operation amount MV2 for operating the second inverter 222. Control is performed so that the q-axis current in the first stator coil 141 is "½" of the first operation amount MV1 and the q-axis current in the second stator coil 142 is "½" of the second operation amount MV2. Thus, the torque of the motor 10 can be set to a value appropriate to the control toward the target angle θp*. In this case, the CPU 322 calculates the second operation amount MV2 while stopping the integral process M282. Thus, it is possible to avoid the interference with the control due to the case where the output values of the integral processes M281 and M282 are values for eliminating different steady-state deviations.

Correspondences between the matters described in the embodiment and the matters described in "SUMMARY" are as follows. Assuming the variable k as "1" or "2", a k-th drive circuit corresponds to the k-th inverter 22k, a k-th processing circuit corresponds to the k-th microcomputer 30k, and a k-th operation amount calculation process corresponds to the feedback operation amount calculation process M20k, the feedforward operation amount calculation process M40k, and the addition process M42k. An output process corresponds to the process of S14. A first use operation process corresponds to the second operation signal generation process M442 when the process of S30 is performed. A second use operation process corresponds to the second operation signal generation process M442 when the process of S34 is performed. An initial value setting process corresponds to the process of S32. An integral element corresponds to the integral gain multiplication process M26k and the integral process M28$k$, corresponds to the process when the result of determination is "YES" in the process of S20, corresponds to the process when the result of determination is "NO" in the process of S28, and corresponds to the process when the result of determination is "NO" in the process of S24.

At least one of the matters described in the embodiment may be modified as follows. In the initial value setting process, it is not essential that the value obtained by subtracting the previous value of the second operation amount MV2 from the previous value of the first operation amount MV1 be set as the previous value of the integral process M282. That is, it is not essential that the value obtained by adding, to the previous value, the value obtained by multiplying together the integral gain Ki and the value obtained by subtracting the current value of the rotation angle θp(2) from the current value of the target angle θp* be set as a current value of the integral process M282 to calculate the initial second operation amount MV2 to be used for operating the second inverter 222. For example, the value obtained by subtracting the previous value of the second operation amount MV2 from the previous value of the first operation amount MV1 may be set as the current value of the integral process M282 to calculate a current value of the second operation amount MV2.

It is not essential that the initial value of the integral process M282 be calculated based on the difference between the first operation amount MV1 and the second operation amount MV2. For example, output values of the integral process M281 may sequentially be transmitted from the first microcomputer 301 to the second microcomputer 302 via the communication line 42, and an output value last received by the second microcomputer 302 may be set as the initial value of the integral process M282.

For example, if the integral gain Ki is not set variable regarding the feedback operation amount MFBk, the integral element may be such a process that the output value of the integral process M28$k$ be multiplied by the integral gain Ki in the integral gain multiplication process M26$k$.

The feedback operation amount MFBk is not limited to the sum of the output values of the proportional element M24$k$, the integral element, and the derivative element. For example, the feedback operation amount MFBk may be the sum of two output values of the proportional element and the integral element, the sum of two output values of the integral element and the derivative element, or the output value of the integral element.

The feedforward operation amount MFFk need not essentially be calculated based on the convertible angle (such as the target angle θp*) alone. For example, the feedforward operation amount MFFk may be set variable depending on a vehicle speed. For example, a value obtained by multiplying a second time derivative of the convertible angle by a proportional coefficient may be added.

It is not essential to calculate the k-th operation amount MVk based on the feedforward operation amount MFFk.

In the embodiment described above, the convertible angle is the angle of the steering shaft, but is not limited to the angle of the steering shaft. For example, the convertible angle may be a steered angle that is a tire turning angle.

In the embodiment described above, the ROM is exemplified as a program storage that constitutes the processing circuit, but the type of the ROM is not described above. For example, the ROM may be a non-rewritable memory or an electrically rewritable non-volatile memory. The program storage is not limited to the ROM.

The processing circuit is not limited to a software processing circuit including a program storage that stores a program and a CPU that executes the program. For example, the processing circuit may be a dedicated hardware circuit such as an application-specific integrated circuit (ASIC) that executes predetermined processes.

The processing circuit is not limited to one of the software processing circuit and the dedicated hardware circuit. A subset of the processes described above may be executed by the software processing circuit, and the remaining processes may be executed by the dedicated hardware circuit.

In the embodiment described above, the controller is exemplified by the apparatus including the two systems that are the first and second systems, but is not limited to this apparatus. For example, the controller may further include a third system. Therefore, the controller may include three or more stator coils, three or more drive circuits, and three or more processing circuits. In this case, it is desirable that one system be set as a main system and the remaining systems be set as subordinate systems.

The motor is not limited to the SPMSM, but may be an interior permanent magnet synchronous motor (IPMSM). In the case of the IPMSM, it is desirable that the k-th operation amount MVk be a torque command value and the torque command value be converted into a d-axis current command value and a q-axis current command value in the k-th operation signal generation process M44$k$. The motor is not limited to the synchronous motor, but may be an induction machine. The motor is not limited to a brushless motor, but may be a brushed direct-current motor.

In the embodiment described above, the drive circuit is exemplified by the three-phase inverter, but is not limited to the three-phase inverter. For example, if a direct-current motor is used as the motor, an H bridge circuit may be used as the drive circuit.

If a direct-current motor is used as the motor, an H bridge circuit may be used as the drive circuit.

It is not essential to provide the relays 261 and 262 or turn OFF the relay 261 in the process of S18. In the process of S18, the relay 241 need not essentially be turned OFF even if the relay 261 is turned OFF.

What is claimed is:
1. A controller for a motor,
the motor being configured to turn a steered wheel and including a first stator coil and a second stator coil insulated from each other,
the controller being configured to operate a first drive circuit connected to the first stator coil and a second drive circuit connected to the second stator coil,
the controller comprising a first processing circuit and a second processing circuit configured to communicate with each other,
the first processing circuit being configured to execute a first operation amount calculation process, an operation process, and an output process,
the first operation amount calculation process being a process of calculating a first operation amount based on an output value of an integral element depending on a difference between a target angle and a convertible angle that is based on a detection value from a first angle sensor, the convertible angle being an angle convertible into a steered angle of the steered wheel,
the operation process being a process of operating the first drive circuit based on the first operation amount,
the output process being a process of outputting the first operation amount to the second processing circuit, the second processing circuit being configured to execute a second operation amount calculation process, a first use operation process, a second use operation process, and an initial value setting process, the second operation amount calculation process being a process of calculating a second operation amount based on an output value of an integral element depending on a difference between the target angle and a convertible angle that is based on a detection value from a second angle sensor, the first use operation process being a process of operating the second drive circuit based on the first operation amount, the second use operation process being a process of operating the second drive circuit based on the second operation amount, the initial value setting process being a process of setting, depending on a value of the integral element of the first operation amount calculation process, an initial value of the integral element to be used for calculating the second operation amount along with switching from the first use operation process to the second use operation process.

2. The controller for the motor according to claim 1, wherein the second operation amount calculation process includes a process of calculating, when the first use operation process is performed, the second operation amount independently of the integral element to be used for calculating the second operation amount, and the initial value setting process includes a process of setting the initial value depending on a difference between the first operation amount and the second operation amount along with the switching from the first use operation process to the second use operation process.

3. The controller for the motor according to claim 1, wherein the second processing circuit is configured to execute a process of switching the first use operation process to the second use operation process when an abnormality occurs such that the first processing circuit stops operating the first drive circuit, and the second operation amount calculation process includes a process of calculating the second operation amount by using the integral element when the first use operation process is switched to the second use operation process based on the abnormality occurring such that the first processing circuit stops operating the first drive circuit.

4. The controller for the motor according to claim 1, wherein the second processing circuit is configured to execute a process of switching the first use operation process to the second use operation process when an absolute value of a difference between the first operation amount and the second operation amount is equal to or larger than a defined value while the first use operation process is performed, the second operation amount calculation process includes a process of calculating the second operation amount independently of the integral element when the first use operation process is performed, and the second operation amount calculation process includes a process of calculating the second operation amount independently of the integral element to be used for calculating the second operation amount when the first use operation process is switched to the second use operation process based on a fact that the absolute value of the difference between the first operation amount and the second operation amount is equal to or larger than the defined value.

5. The controller for the motor according to claim 1, wherein the second processing circuit is configured to execute a process of switching the first use operation process to the second use operation process when an abnormality occurs in communication between the first processing circuit and the second processing circuit, and the second operation amount calculation process includes a process of calculating the second operation amount independently of the integral element to be used for calculating the second operation amount when the first use operation process is switched to the second use operation process based on the abnormality occurring in the communication.

6. The controller for the motor according to claim 4, wherein the second operation amount calculation process is a process of calculating the second operation amount based on an operation amount for feed forward controlling the convertible angle to the target angle in addition to an operation amount for feedback controlling the convertible angle to the target angle.

* * * * *